(12) United States Patent
Nakamura et al.

(10) Patent No.: US 6,414,073 B1
(45) Date of Patent: Jul. 2, 2002

(54) PRESSURE-SENSITIVE ADHESIVE MATERIAL

(75) Inventors: Koichi Nakamura; Hiroshi Yamamoto; Tatsumi Amano; Kazuhiko Shibata; Chiaki Harada, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/536,352

(22) Filed: Mar. 27, 2000

(30) Foreign Application Priority Data

Apr. 7, 1999 (JP) ............................... 11-099889

(51) Int. Cl.[7] .................. C08L 45/00; C08L 47/00; C08L 7/00
(52) U.S. Cl. ................. 524/505; 524/509; 524/481; 524/270; 525/98; 525/285
(58) Field of Search .................... 524/505, 509, 524/481, 270; 525/98, 285; 526/935

(56) References Cited

U.S. PATENT DOCUMENTS 3,850,858 A * 11/1974 Park ........................... 525/98
4,431,598 A * 2/1984 Korpman ..................... 525/98
5,468,237 A * 11/1995 Miller et al. ................. 525/98

FOREIGN PATENT DOCUMENTS

JP 11-116923 4/1999

* cited by examiner

Primary Examiner—James J. Seidleck
Assistant Examiner—Olga Asinovsky
(74) Attorney, Agent, or Firm—Kilyk & Bowersox P.P.L.C.

(57) ABSTRACT

A pressure-sensitive adhesive material comprises a pressure-sensitive adhesive layer comprising 100 parts by weight of natural rubber and 10 to 120 parts by weight of styrene-isoprene-styrene block copolymer (SIS) having a radiate configuration with a styrene content of 10 to 45% by weight. Preferably, the pressure-sensitive adhesive layer is free of metals or metal compounds. The pressure-sensitive adhesive layer may contain 5 to 150 parts by weight of a tackifier having an acid value of 1.5 or more. The pressure-sensitive adhesive material includes (A) a backing-less tape having a release liner having on one surface thereof the pressure-sensitive adhesive layer and (B) a double-coated tape having a backing having respective pressure-sensitive adhesive layers on surfaces thereof, at least one of which is constituted by the pressure-sensitive adhesive layer of the above-described type.

20 Claims, No Drawings

PRESSURE-SENSITIVE ADHESIVE MATERIAL

BACKGROUND OF THE INVENTION

1. FIELD OF THE INVENTION

The present invention relates to a pressure-sensitive adhesive material and more particularly to a pressure-sensitive adhesive material useful for applications involving immersion in an aqueous liquid such as water, ink or alkali in a state where an adherend is adhered thereto.

2. DESCRIPTION OF THE RELATED ART

Sometimes the adherend to which a pressure-sensitive material is adhered is contacted with or immersed in aqueous liquids such as water, aqueous solution or aqueous dispersion. For example, in the process of dyeing fabric, the fabric is bonded to a stainless steel plate or iron plate with a pressure-sensitive adhesive double-coated tape before it can be immersed in an aqueous solution of a dye. Also, in the process of polishing silicon wafers, liquid crystal glasses, etc., a pad carrying abrasive slurry called abrasive cloth is used by bonding it to a mechanical surface plate with a pressure-sensitive adhesive double-coated tape. In this case, during the polishing, the pressure-sensitive adhesive layers of the pressure-sensitive adhesive double-coated tape are exposed to an aqueous liquid in which abrasive is dispersed. (3) In these applications, the pressure-sensitive adhesive material of the pressure-sensitive adhesive double-coated tape must be peeled off again from the stainless steel plate, iron plate, or mechanical surface plate after use. For this purpose, films made of polyethylene terephthalate (PET) or the like material that has high strength as the backing and the pressure-sensitive adhesive layer must have cohesion or anchoring power to the backing in the case of the pressure-sensitive adhesive double-coated tape. In some cases, a backing-less, pressure-sensitive adhesive tape is applied in advance only to a necessary portion of a film such as PET film to transfer a pressure-sensitive adhesive layer to the film and the resulting film is used by laminating it on various members.

In such a pressure-sensitive adhesive material, use of acrylic pressure-sensitive adhesive as the pressure-sensitive adhesive constituting the pressure-sensitive adhesive layer tends to give some cohesion or anchoring power to the backing but because of its high water absorption, its cohesion and anchoring power decreases when it is immersed in aqueous liquids and the pressure-sensitive adhesive remains on the adherend. In the case of acrylic pressure-sensitive adhesives, a time-dependent increase in adhesion is disadvantageous to removability.

In the case where synthetic rubber such as styrene-butadiene-styrene block copolymer (SBS) or the like is used as the pressure-sensitive pressure adhesive constituting the pressure-sensitive adhesive layer, adjustment of cohesion by the styrene content of the synthetic rubber can give anchoring power to PET or the like with ease. However, such a pressure-sensitive adhesive has high elastic modulus so that it cannot gain broader adhesion area at its true interface when it is applied, with the result that water invades at the interface during immersion in the aqueous liquid to thereby decrease its adhesion to the adherend.

Furthermore, the natural rubber-based pressure-sensitive adhesives are best in view of low water absorption and low time-dependent increase in adhesion. However, natural rubbers have low anchoring powers to PET so that adhesion facilitation treatment such as provision of undercoat is needed. However, such means is still insufficient.

On the other hand, in some of the above-mentioned applications, presence of metal ions is undesirable. For example, in the process of polishing silicon wafers, there is the possibility that metals ions such as Mg, Al, Ca, Fe, Ni, Cu, Zn, Cr, Zr, Ti, etc. could cause failures in subsequent circuit formation step. Also, in the process of dyeing fabrics, metal ions cause agglomeration of dyestuff or pigment, occasionally forming uneven dyeing or precipitation In the case of natural rubber-based pressure-sensitive adhesives, use is made of Zn, Ca, Mg, Al, S, etc. or oxides thereof as a filler or crosslinking agent to exhibit cohesion. In the above-mentioned applications, the cohesion of pressure-sensitive adhesive is a very important factor. However, use of metals or metal oxides has the possibility of causing problems as explained above. Accordingly, crosslinking with polyisocyanates, crosslinking with phenol resins, and crosslinking with peroxides have been studied. The crosslinking with polyisocyanates tends to impart sufficient anchoring power to the pressure-sensitive when the backing is made of PET but when it is immersed in water, it undergoes hydrolysis, resulting in that the cohesion tends to decrease. The crosslinking with the phenol resin requires high temperatures and if the pressure-sensitive adhesive is directly to the backing, the backing of film may sometimes be deformed. When the pressure-sensitive adhesive coated on a release liner is applied to a backing to transfer the adhesive, the pressure-sensitive adhesive has low anchoring power to the backing and no desirable result can be obtained. Further, to effect reaction at low temperatures, it is necessary to use complexes of phenol resins with Mg, Ca, etc. However, these cannot be used in applications where metal ions are undesirable. Use of the crosslinking with peroxides is accompanied by the danger upon production, causes an odor to remain in the pressure-sensitive adhesive or the residue to undergo deterioration per day.

SUMMARY OF THE INVENTION

Therefore, an object of the present invention is to provide a pressure-sensitive adhesive material that sufficiently exhibits cohesion of the pressure-sensitive adhesive layer and anchoring power to the backing and that maintains the cohesion and anchoring power when immersed in an aqueous liquid without compounding a metal or metal compound.

With view to achieving the above object, the present inventors have made intensive research and as a result they have found that construction of the pressure-sensitive adhesive layer from a pressure-sensitive adhesive comprising natural rubber and a specified styrene-isoprene-styrene block copolymer (SIS) in a specified ratio not only gives rise to excellent cohesion and anchoring power but also maintains the cohesion and anchoring power when it is contacted with or immersed in water in a state where an adherend is attached. The present invention has been accomplished based on this discovery.

That is, the present invention provides a pressure-sensitive adhesive material comprising a pressure-sensitive adhesive layer comprising 100 parts by weight of natural rubber and 10 to 120 parts by weight of styrene-isoprene-styrene block copolymer (SIS) having a radiate configuration with a styrene content of 10 to 45% by weight.

In a first aspect, the present invention provides a pressure-sensitive adhesive material comprising a pressure-sensitive adhesive layer comprising 100 parts by weight of natural rubber and 10 to 120 parts by weight of styrene-isoprene-styrene block copolymer (SIS) having a radiate configuration with a styrene content of 10 to 45% by weight.

Here, the pressure-sensitive adhesive layer is preferably free of metals or metal compounds.

The pressure-sensitive adhesive layer may contain a resin having an acid value of 1.5 or more in an amount of 5 to 150 parts by weight as a tackifier.

The resin having an acid value of 1.5 or more as a tackifier may be a maleic anhydride-modified resin.

The pressure-sensitive adhesive material may be a backing-less tape that comprises a release liner and the pressure-sensitive adhesive layer on a surface of the release liner.

The pressure-sensitive adhesive material may be a pressure-sensitive adhesive double-coated tape having pressure-sensitive adhesive layers on respective surfaces thereof, at least one of which is constituted by the pressure-sensitive adhesive layer.

The pressure-sensitive adhesive material may be used in the presence of an aqueous liquid.

In a second aspect, the present invention provides a method for adhesion using a pressure-sensitive adhesive material, comprising applying the above pressure-sensitive material in the presence of an aqueous liquid.

Another object of the present invention is to provide an adhesive preparation used by applying in oral cavity that is of a form such that it can be used effectively in view of easy handling in the field of therapy.

DETAILED DESCRIPTION OF THE PRESENT INVENTION

The natural rubber is not particularly limited but may be adjusted so as to have a Mooney viscosity of, for example, about 10 to about 100 by mastication in a mixing mill.

As the styrene-isoprene-styrene block copolymer (hereafter, abbreviated as "SIS"), use is made of a polymer that has a radiate configuration and comprises 10 to 45% by weight, preferably 15 to 40% by weight of styrene as a constituent monomer. Here, the SIS having a radiate configuration is a block copolymer composed of block copolymer units coupled with each other through a trifunctional or higher coupling agent so as to have a radiate configuration, each of the block copolymer units consisting of a polymer block A composed of styrene (polystyrene block) and a polymer block B composed of isoprene (polyisoprene block). As such an SIS, there can be used, for example, KRATON D-1320X, trade name for a product by SHELL CHEMICAL INC., "Quintac 3460C", "Quintac 3450", "Quintac 3430", "Quintac SL-117", trade names for products by NIPPON ZEON CO., LTD., and so on.

The blending amount of SIS is 10 to 120 parts by weight per 100 parts by weight of the natural rubber.

When the pressure-sensitive adhesive layer is formed by blending the natural rubber and the SIS having a specified configuration as described above, a sufficient adhesion area can be gained at the interface between the pressure-sensitive adhesive layer and the adherend due to the low elasticity of the natural rubber when the pressure-sensitive adhesive material is applied and at the same time apparent anchoring power to the backing film can be increased due to high elastic modulus of SIS. That is, assuming that the anchoring power is defined as power required for peeling the pressure-sensitive adhesive layer from the backing film at a predetermined angle, such as 90° peeling adhesive strength, the higher the elastic modulus of the pressure-sensitive adhesive layer itself is, the greater is the anchoring power is exhibited. Also, in the present invention, as the styrene-isoprene-styrene block copolymer (hereafter, abbreviated as "SIS"), the proportion of styrene to the total constituent monomers is set in a specified range and in addition SIS has a radiate configuration, so that the cohesion of the pressure-sensitive adhesive layer will not decrease if it is immersed in water. Here, SIS having a radiate configuration is a SIS block copolymer that comprises (A) a copolymer block composed mainly of styrene (vinyl aromatic compound) and (B) a copolymer block composed mainly of isoprene (conjugated diene compound) linked through a tri-functional or more coupling agent.

In the present invention, conventional or known crosslinking methods may be used to adjust the cohesion and anchoring power of the pressure-sensitive adhesive layer auxiliary as needed. In this case, it is preferred that the pressure sensitive adhesive layer contain neither metal nor metal compound by use of crosslinking agents other than metals or metal compounds, such as polyisocyanate. The pressure-sensitive adhesive material free of metals or metal compounds are useful particularly as a pressure-sensitive adhesive material for fixing abrasive cloths for polishing electronic components such as silicon wafers or fabric to be dyed.

The pressure-sensitive layer in the present invention may contain a tackifier in addition to the natural rubber and SIS. As the tackifier, use may be made of conventional tackifiers, for example, terpene phenol resins, rosin-based resins, petroleum-based resins, etc. The tackifiers may be used singly or as mixtures of two or more of them. The usage of the tackifier may be selected properly within the range where the pressure-sensitive adhesive property is not deteriorated, for example, in total on the order of 20 to 150 parts by weight per 100 parts by weight of the natural rubber.

In this case, addition of particularly a resin having a high acid value, for example, a resin having an acid value of of 1.5 or more (e.g., about 1.5 to about 30), preferably about 2 to about 20, in an amount of 5 parts by weight or more, preferably 5 to 100 parts by weight, per 100 parts by weight of natural rubber can impart the pressure-sensitive adhesive with high adhesion and further increase anchoring power to the backing film. Such resins include, for example, "Quintone C200L" (maleic anhydride-modified C5 resin; acid value 17) trade name for a product by NIPPON ZEON CO., LTD., "Quintone D200" (maleic anhydride-modified C5, C9 resin; acid value 17) trade name for a product by NIPPON ZEON CO., LTD., "HILETS R100X" (aliphatic-based hydrocarbon resin; acid value 2.5) trade name for a product by MITSUI CHEMICAL CO. LTD., "HILETS R500X" (aliphatic-based hydrocarbon resin; acid value 2) trade name for a product by MITSUI CHEMICAL CO. LTD., "Pentaline 4821" (acid value 22.5) trade name for a product by RIKA HERCULES CO., LTD., etc. The pressure-sensitive adhesive layer in the present invention may further contain conventional additives such as anti-oxidant.

The pressure-sensitive adhesive material of the present invention includes (A) a backing-less tape that comprises a release liner and the pressure-sensitive adhesive layer on a surface of the release liner and (B) a pressure-sensitive adhesive double-coated tape having pressure-sensitive adhesive layers on respective surfaces thereof, at least one of which is constituted by the pressure-sensitive adhesive layer.

The film thickness of the above pressure-sensitive adhesive layer may be selected from a broad range depending on the application, etc. of the pressure-sensitive adhesive tape and usually, its film thickness is about 10 to 150 $\mu$m, preferably 30 to 100 $\mu$m.

As the release liner in the backing-less tape (A) above, use may be made of conventional release liners that can be commonly used in the field of pressure-sensitive adhesive tapes. The backing-less tape (A) can be produced, for example, by dissolving or dispersing the components constituting the above-mentioned pressure-sensitive adhesive layer (i.e., natural rubber, SIS, and other components) in a solvent such as toluene, coating the solution or dispersion on a release liner, drying the coat in an oven with internal air circulation or the like to form a pressure-sensitive adhesive layer, and then winding it up.

Examples of the backing in the above double-coated tape (B) include those usually used as a backing for pressure-sensitive adhesive tapes, for example, plastic films, for example, polyester films such as polyethylene terephthalate (PET) film, polyolefin films such as polypropylene film, polyvinyl chloride films, polyamide films, etc. The double-coated tape (B) can be produced, for example, by directly coating a coating solution containing the components constituting the above pressure-sensitive adhesive layer on at least one surface of the backing film, drying the coat to form a pressure-sensitive adhesive layer, applying the pressure-sensitive adhesive layer to release liner such as release paper, and winding the resulting tape. The double-coated tape (B) may also be produced by coating the above coating solution on a release liner such as release paper, drying it to form a pressure-sensitive adhesive layer, and then applying the pressure-sensitive adhesive layer to a backing film. Formation of the pressure-sensitive adhesive layer directly on the backing film results in higher an anchoring effect.

When it is used to conjugate members (adherends) together and the thus formed laminate happens to be brought in contact with water, the pressure-sensitive adhesive material of the present invention does not suffer from a decrease in cohesion or anchoring power of the pressure sensitive adhesive layer. Therefore, the pressure-sensitive adhesive material of the present invention is useful as one for use in the presence of an aqueous liquid particularly when it is contacted with aqueous liquid, e.g., aqueous solution, aqueous dispersion, etc. such as water, ink, and an alkali or immersed in the aqueous liquid.

The pressure-sensitive adhesive material of the present invention has high cohesion and anchoring power of the pressure-sensitive adhesive layer to the backing without compounding thereto metals or metal compounds and yet maintains its cohesion and anchoring power even when it is immersed in aqueous liquid.

EXAMPLES

Hereinafter, the present invention will be explained in more detail by examples. However, the present invention is not limited thereto. Unless otherwise indicated specifically, all parts are by weight.

Example 1

A pressure-sensitive adhesive solution was prepared by dissolving in toluene 100 parts of natural rubber (Mooney viscosity of 75), 30 parts of SIS (manufactured by NIPPON ZEON CO., LTD., trade name: "Quintac 3460C", radiate configuration SIS, styrene content of 25% by weight), 40 parts of maleic anhydride-modified C5,C9 resin (NIPPON ZEON CO., LTD., trade name: "Quintone D-200", acid value of 17), 30 parts of a terpene resin (YASUHARA CHEMICAL CO., LTD., trade name: "YS Resin Px1250", acid value 1 or less), and 1 part of a phenol-based anti-oxidant (OUCHI-SHINKO CO., LTD., trade name: "Nocrack NS-6"). The obtained pressure-sensitive adhesive solution was coated on both surfaces of polyethylene terephthalate (PET) film (backing) to a thickness of 35 µm on dry basis and dried in an oven with internal air circulation at 100° C. for 3 minutes. Thereafter, this was applied to a release liner to obtain a pressure-sensitive adhesive double-coated tape.

Example 2

A pressure-sensitive adhesive solution was prepared by dissolving in toluene 100 parts of natural rubber (Mooney viscosity of 10), 60 parts of SIS (manufactured by NIPPON ZEON CO., LTD., trade name: "Quintac SL-117", radiate configuration SIS, styrene content of 37% by weight), 20 parts of aliphatic hydrocarbon resin (MITSUI CHEMICAL CO., LTD., trade name: "HILETS R500", acid value 2), 40 parts of a terpene phenol resin (YASUHARA CHEMICAL CO., LTD., trade name: "YS Polystar T115"), 5 parts of polyisocyanate (NIPPON POLYURETHANE CO., LTD., trade name: "Coronate L"), and 1 part of phenol-based anti-oxidant (OUCHI-SHINKO CO., LTD., trade name: "Nocrack NS-6"). The obtained pressure-sensitive adhesive solution was coated on both surfaces of PET film (backing) to a thickness of 35 µm on dry basis and dried in an oven with internal air circulation at 100° C. for 3 minutes. Thereafter, this was applied to a release liner to obtain a pressure-sensitive adhesive double-coated tape.

Example 3

A pressure-sensitive adhesive solution was prepared by dissolving in toluene 100 parts of natural rubber (Mooney viscosity of 97), 100 parts of SIS (manufactured by SHELL CHEMICAL INC., trade name: "KRATON D-1320X", radiate configuration SIS, styrene content: 10% by weight), 60 parts of maleic anhydride-modified C5 resin (NIPPON ZEON CO., LTD., trade name: "Quintone C200L", acid value of 17), 60 parts of a terpene resin (YASUHARA CHEMICAL CO., LTD., trade name: "YS Resin Px1150", acid value 1 or less), 5 parts of polyisocyanate (NIPPON POLYURETHANE CO., LTD., trade name: "Coronate L"), and 1 part of phenol-based anti-oxidant (OUCHI-SHINKO CO., LTD., trade name: "Nocrack NS-6"). The obtained pressure-sensitive adhesive solution was coated on a release liner to a thickness of 35 µm on dry basis and dried in an oven with internal air circulation at 100° C. for 3 minutes. Thereafter, this was applied to a release liner to obtain a backing-less, pressure-sensitive adhesive tape.

Comparative Example 1

A pressure-sensitive adhesive solution was prepared by dissolving in toluene 100 parts of natural rubber (Mooney viscosity of 75), 90 parts of aterpene resin (YASUHARA CHEMICAL CO., LTD., trade name: "YS Resin Px1250", acid value 1 or less), 5 parts of polyisocyanate (NIPPON POLYURETHANE CO., LTD., trade name: "Coronate L"), and 1 part of a phenol-based anti-oxidant (OUCHI-SHINKO CO., LTD., trade name: "Nocrack NS-6"). The obtained pressure-sensitive adhesive solution was coated on both surfaces of polyethylene terephthalate (PET) film (backing) to a thickness of 35 µm on dry basis and dried in an oven with internal air circulation at 100° C. for 3 minutes. Thereafter, this was applied to a release liner to obtain a pressure-sensitive adhesive double-coated tape.

Comparative Example 2

A pressure-sensitive adhesive solution was prepared by dissolving in toluene 100 parts of natural rubber (Mooney viscosity of 75), 30 parts of SIS (manufactured by JSR CORPORATION, trade name: "JSR5500", linear configuration SIS, styrene content of 14% by weight), 90 parts of a terpene resin (YASUHARA CHEMICAL CO., LTD., trade name: "YS Resin Px1150", acid value 1 or less), 5 parts of polyisocyanate (NIPPON POLYURETHANE CO., LTD., trade name: "Coronate L"), and 1 part of a phenol-based anti-oxidant (OUCHI-SHINKO CO., LTD., trade name: "Nocrack NS-6"). The obtained pressure-sensitive adhesive solution was coated on both surfaces of polyethylene terephthalate (PET) film (backing) to a thickness of 35 $\mu$m on dry basis and dried in an oven with internal air circulation at 100° C. for 3 minutes. Thereafter, this was applied to a release liner to obtain a pressure-sensitive adhesive double-coated tape.

Evaluation Test (Initial holding power)

25 PET was backed to each pressure-sensitive adhesive obtained in Examples 1 to 3 and Comparative Examples 1 and 2 and a portion of 20 mm long and 10 mm wide was sufficiently pressed to a SUS plate so that it could adhered. This was aged at 60° C. for 30 minutes. The pressure-sensitive adhesive tape was draped and in this state the time (minute) for the pressure-sensitive adhesive tape to fall under applying a load of 1 kg vertically at 60° C. was measured.

(Holding power after immersion in warm water)

Each pressure-sensitive adhesive tape was pressed onto a SUS plate in the same manner as in the case of the measurement of above-mentioned initial holding power and in this state the tape was immersed in warm water at 60° C. for 3 days and the falling time (minute) was measured as described above.

(Initial anchoring power)

25 PET was backed to each of the pressure-sensitive double-coated adhesive tapes obtained in Examples 1 and 2 and Comparative Examples 1 and 2 and adhered using a hand roller so that the sized surfaces faced together and the tape was cut to a size of 30 mm wide and 100 mm long. This was pressed under the conditions of 120° C.×3 kg/cm$^2$×20 seconds using a heat press and subjected to T-Peel at an elongation speed of 300 mm/minute and peeling strength (gf/25 mm) was measured.

(Anchoring power after immersion in warm water)

Double-coated tapes was applied so that the sized surfaces faced together and heat pressed in the same manner as in the case of measurement of the above initial anchoring power and in this state the tape was immersed in warm water at 60° C. for 3 days and the peeling strength (gf/25 mm) was measured as described above.

(Metal Content)

The quantitative analysis of metal elements (Mg, Al, Ca, Fe, Ni, Cu, Zn, Cr, Zr, and Ti) contained in the pressure-sensitive adhesive layer in the pressure-sensitive adhesive material in each of Examples and Comparative Examples was performed by ICP (Inductivity Coupled Plasma) emission spectrochemical analysis. As a result, it revealed that the content of each metal was at a level that caused practically no problem (1 ppm or less).

TABLE 1

|  | Example 1 (part) | Example 2 (part) | Example 3 (part) | Comparative Example 1 (part) | Comparative Example 2 (part) |
|---|---|---|---|---|---|
| Natural Rubber | 100 | 100 | 100 | 100 | 100 |
| Mooney viscosity | 75 | 10 | 97 | 75 | 75 |
| SIS | 30 | 60 | 100 |  | 30 |
|  | Quintac 3460c | Quintac SL117 | KRATON D-1320X |  | JSR5500 |
| Styrene content (wt %) | 25 | 37 | 10 |  | 14 |
| Structure | Radiate | Radiate | Radiate |  | Linear |
| Maleic anhydride-modified resin | 40 Quintone D-200 |  | 60 Quintone C-200L |  |  |
| Acid value | 17 |  | 17 |  |  |
| Aliphatic hydrocarbon resin |  | 20 HILETS R500 |  |  |  |
| Acid value |  | 2 |  |  |  |
| Terpene resin | 30 YS Resin P x 1250 |  | 60 YS Resin P x 1150 | 90 YS Resin P x 1250 | 90 YS Resin P x 1150 |
| Acid value | 1 or less |  | 1 or less | 1 or less | 1 or less |
| Terpene phenol resin |  | 40 YS Polystar T115 |  |  |  |
| Polyisocyanate | 5 Coronate L | 5 Coronate L | 5 Coronate L | 5 Coronate L | 5 Coronate L |
| Phenol anti-oxidant | 1 Nocrack NS-6 | 1 Nocrack NS-6 | 1 Nocrack NS-6 | 1 Nocrack NS-6 | 1 Nocrack NS-6 |
| Initial holding power | 60 minutes or more | 60 minutes or more | 60 minutes or more | 60 minutes or more | 60 minutes or more |
| Holding power after immersion in warm water (60° C., 3 days) | 60 minutes or more | 60 minutes or more | 60 minutes or more | 10 minutes | 15 minutes |
| Initial anchoring power (gf/25 mm) | 1100 | 900 |  | 600 | 750 |

TABLE 1-continued

|  | Example 1 (part) | Example 2 (part) | Example 3 (part) | Comparative Example 1 (part) | Comparative Example 2 (part) |
|---|---|---|---|---|---|
| Anchoring power after warm water immersion anchoring effect (gf/25 mm) | 950 | 850 |  | 400 | 400 |

The invention may be embodied in other specific forms without departing from the spirit or essential characteristics thereof. Therefore, the present embodiment is to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pressure-sensitive adhesive material comprising a pressure-sensitive adhesive layer comprising 100 parts by weight of natural rubber and 10 to 120 parts by weight of styrene-isoprene-styrene block copolymer (SIS) having a radiate configuration with a styrene content of 10 to 45% by weight.

2. The pressure-sensitive adhesive material as claimed in claim 1, wherein the pressure-sensitive adhesive layer is free of metals or metal compounds.

3. The pressure-sensitive adhesive material as claimed in claim 1, wherein the pressure-sensitive adhesive layer contains a resin having an acid value of 1.5 or more in an amount of 5 to 150 parts by weight as a tackifier.

4. The pressure-sensitive adhesive material as claimed in claim 2, wherein the pressure-sensitive adhesive layer contains a resin having an acid value of 1.5 or more in an amount of 5 to 150 parts by weight as a tackifier.

5. The pressure-sensitive adhesive material as claimed in claim 3, wherein the resin having an acid value of 1.5 or more as a tackifier is a maleic anhydride-modified resin.

6. The pressure-sensitive adhesive material as claimed in claim 4, wherein the resin having an acid value of 1.5 or more as a tackifier is a maleic anhydride-modified resin.

7. The pressure-sensitive adhesive material as claimed in claim 1, wherein the pressure-sensitive adhesive material is a backing-less tape that comprises a release liner and the pressure-sensitive adhesive layer on a surface of the release liner.

8. The pressure-sensitive adhesive material as claimed in claim 7, wherein the pressure-sensitive adhesive layer is free of metals or metal compounds.

9. The pressure-sensitive adhesive material as claimed in claim 7, wherein the pressure-sensitive adhesive layer contains a resin having an acid value of 1.5 or more in an amount of 5 to 150 parts by weight as a tackifier.

10. The pressure-sensitive adhesive material as claimed in claim 8, wherein the pressure-sensitive adhesive layer contains a resin having an acid value of 1.5 or more in an amount of 5 to 150 parts by weight as a tackifier.

11. The pressure-sensitive adhesive material as claimed in claim 9, wherein the resin having an acid value of 1.5 or more as a tackifier is a maleic anhydride-modified resin.

12. The pressure-sensitive adhesive material as claimed in claim 10, wherein the resin having an acid value of 1.5 or more as a tackifier is a maleic anhydride-modified resin.

13. The pressure-sensitive adhesive material as claimed in claim 1, wherein the pressure-sensitive adhesive material is a pressure-sensitive adhesive double-coated tape having pressure-sensitive adhesive layers on respective surfaces thereof, at least one of which is constituted by the pressure-sensitive adhesive layer.

14. The pressure-sensitive adhesive material as claimed in claim 13, wherein the pressure-sensitive adhesive layer is free of metals or metal compounds.

15. The pressure-sensitive adhesive material as claimed in claim 13, wherein the pressure-sensitive adhesive layer contains a resin having an acid value of 1.5 or more in an amount of 5 to 150 parts by weight as a tackifier.

16. The pressure-sensitive adhesive material as claimed in claim 14, wherein the pressure-sensitive adhesive layer contains a resin having an acid value of 1.5 or more in an amount of 5 to 150 parts by weight as a tackifier.

17. The pressure-sensitive adhesive material as claimed in claim 15, wherein the resin having an acid value of 1.5 or more as a tackifier is a maleic anhydride-modified resin.

18. The pressure-sensitive adhesive material as claimed in claim 16, wherein the resin having an acid value of 1.5 or more as a tackifier is a maleic anhydride-modified resin.

19. The pressure-sensitive adhesive material as claimed in claim 1, the pressure-sensitive adhesive material is used in the presence of an aqueous liquid.

20. A method for adhesion using a pressure-sensitive adhesive material, comprising applying the pressure-sensitive material as claimed in claim 1 in the presence of an aqueous liquid.

* * * * *